Dec. 3, 1940.                H. SÜSS                2,223,747
APPARATUS FOR CONTINUOUS EXTRACTION OF OIL FROM SEED
Filed Dec. 3, 1938
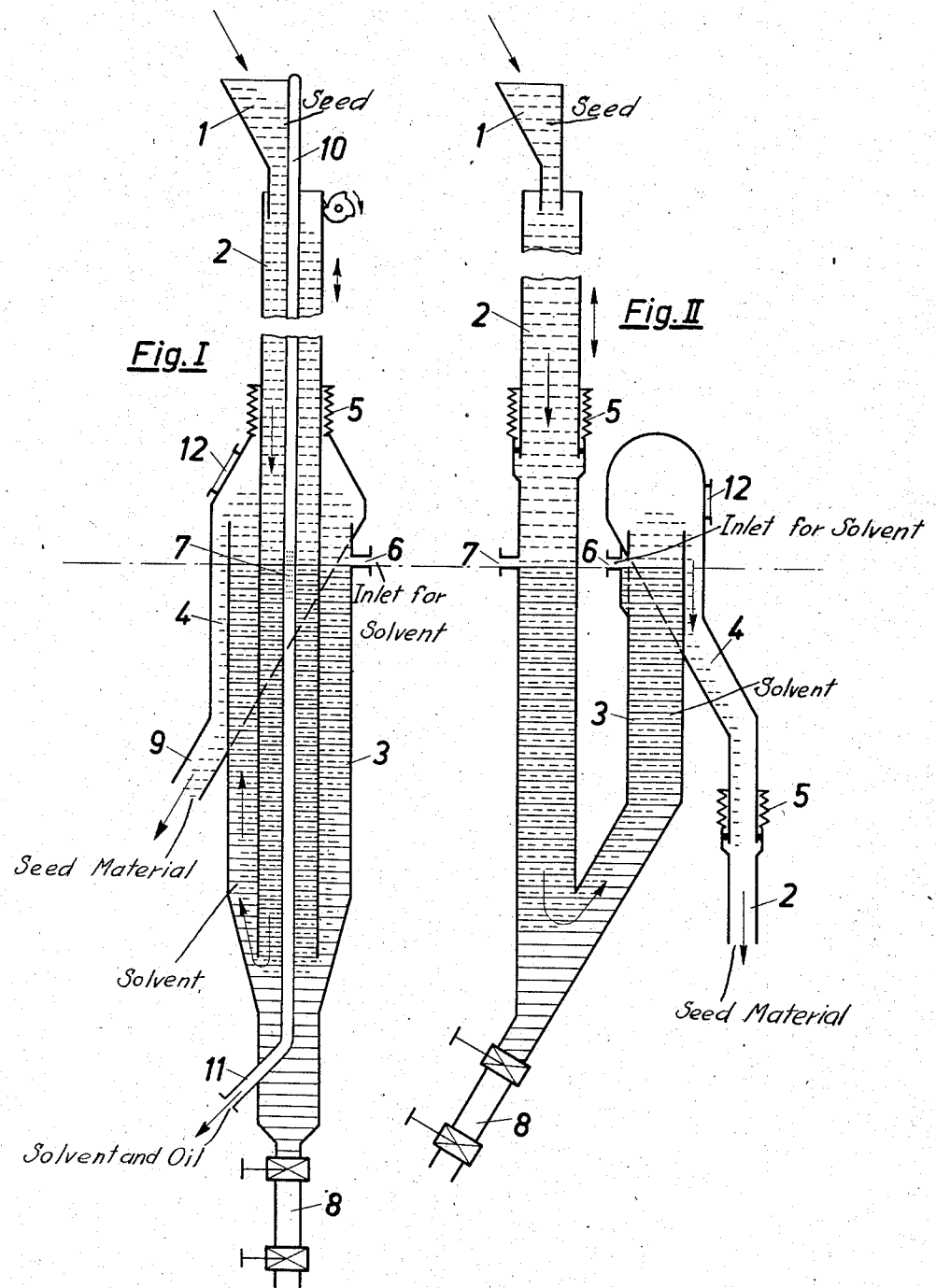
INVENTOR
HEINRICH SÜSS
BY
ATTORNEYS Patented Dec. 3, 1940

2,223,747

UNITED STATES PATENT OFFICE 2,223,747

APPARATUS FOR CONTINUOUS EXTRACTION OF OIL FROM SEED

Heinrich Süss, Berlin-Tegel, Germany, assignor, by mesne assignments, to Maschinen- und Metallwaren-Handelsgesellschaft m. b. H., Berlin, Germany, a limited-liability company of Germany Application December 3, 1938, Serial No. 243,703
In Germany December 6, 1937

6 Claims. (Cl. 23—270)

In order to extract oil from seed or other oil-containing material there are preferably used intermittently working batteries of extractors or single extractors. The heretofore used continuously working apparatus for the extraction of oil from seed by means of a lye have not been fully successful in practice, because devices of this kind are not suitable for all kinds of seed and on account of the complicated mechanical drive required in this case are subject to frequent troubles during operation. Thus, for instance, the seed had been moved through the apparatus during the process of extraction of the oil by means of a lye by mechanical conveying means such as worms, agitators, elevators and the like. However, conveying devices, such as worms or agitators, for moving the seed are connected with the drawback that the seed is liable to be crushed into the form of small plates and subsequently ground into a more or less fine powder. Powdered materials, however, are greatly undesirable for an extraction process, experience having shown that shreds thus produced will be of poor quality. On the other hand, extractors in which the seed is not moved during the process of extraction are constructed in such a way that small quantities of the seed are conveyed in vessels through the solvent, this requiring a rather complicated driving mechanism. In this case the particles of the seed, irrespective of the leakage, cannot be prevented against falling into the interstices between the friction surfaces moving relatively to each other with some clearance, with the result that said particles will be liable to be jammed-in between said surfaces, thus causing troubles during the operation of the extractor. Also, attempts have been made to utilize the different specific gravity of the solvent and the seed for imparting motion to the latter during the process of extraction in order to essentially reduce the necessary amount of mechanical contrivances. In the latter case, however, mechanical devices cannot fully be dispensed with, as it will still be necessary to employ supply and discharge means in the form of worms, agitators and the like.

By my invention all aforementioned drawbacks inherent to devices of the present kind are obviated essentially by causing the seed to move by action of its own weight through the solvent and to assist this motion of the seed by imparting small mechanical impulses thereto, the specific gravity of the solvent being greater than that of the seed to be subjected to the process of extraction. Extraction apparatus constructed in accordance with my invention are free of any interior mechanical devices which will greatly simplify the apparatus and the mode of operating the same.

More particularly, according to my invention the seed to be treated by the process of extraction is carried through a vertical tube and periodical upward and downward motion is imparted to said tube. Preferably said tube is moved slowly in upward and quickly in downward direction in order to accelerate the descent of the seed through the tube. Moreover, according to my invention the seed is discharged from the under end of said tube and ascends outside of the latter within a vessel containing the solvent and being in open communication with the tube. The aforesaid periodical upward and downward motion imparted to said tube for supplying the seed to the extraction apparatus will produce periodical impulses propagating through the solvent, said impulses forcing the seed subsequent to extraction of the oil by means of the lye above the liquid level of the solvent. In this manner the seed subsequent to being treated may continuously be discharged from the extraction apparatus. Moreover, the process of extraction may further be improved by causing the solvent to flow in counter-current to the motion of the seed.

The details of my new process of extraction and of the apparatus for carrying my invention into effect will be more fully described with reference to the accompanying drawing forming part of this specification.

In the drawing I have diagrammatically represented two forms of construction of my new extraction apparatus, the one form being shown in Fig. 1 and the other in Fig. 2.

Referring first to the extraction apparatus represented in Fig. 1, the seed to be subjected to the process of extraction, which seed, for instance, may be a comminuted oil seed, is supplied to the extraction apparatus by way of the charging hopper 1 provided at the upper end of the vertical tube 2. Said tube 2 which is open at both ends is surrounded at its under portion by a vessel 3 arranged concentrically to the tube, said vessel being in open communication with said tube and containing the solvent, which is of greater specific gravity than the seed. The solvent may for instance consist of ethylene trichloride. The tube 2 is equipped with a mechanical driving device (not shown), the stroke of the latter being adjustable in a manner to periodically move the said tube slowly in upward and quickly in downward direction. Within the tube 2 there is provided a pipe 10 which is foraminated, as indicated at 7, at the height of the intake 6 for the tube. At its under end 11 the pipe 10 terminates into an outlet serving for the discharge of the solvent enriched with oil. The vessel 3 is filled with solvent as far as up to the inlet 6. The upper end of the vessel 3 is surrounded on all sides by a chute 4 serving for the reception of the material subsequent to being treated by the solvent, said material being discharged from the chute 4 through the outlet 9 provided thereon. Interposed between the chute 4 and the upwardly and downwardly movable tube 2 is a flexible connecting device, such as bellows 5 serving to tighten said chute against said tube. The window 12 in the wall of the chute permits inspection of the transit of the material treated by the solvent from the vessel 3 into the chute 4.

The column of seed material contained in the tube 2 is prevented from moving out of the under end of the tube 2, as the weight of said column is not sufficient to overcome the friction between the swollen seed material and the wall of the tube; moreover, the buoyancy of said material prevents further sagging within the tube. However, if the tube 2 is lifted to some extent, the column of seed material contained therein will remain at rest. On the other hand, if the tube is suddenly moved downward, a certain amount of the seed material will likewise move downward. Thus, by continuously moving the tube 2 upward and downward in the aforementioned manner, the seed material continuously moves further downward within the tube 2, until it is finally discharged at the under end of the tube, whereupon it ascends within the vessel 3, the specific gravity of the seed being smaller than that of the solvent. The solvent contained in the vessel 3 extends in upward direction as far as to the inlet 6 for the vessel and is carried in a condition enriched with oil in counter-current to the ascending seed material through the sieve-like perforations 7 in the pipe 10.

The seed material introduced into the vessel 3 upon upward and downward motion of the tube 2 due to the impact imparted to said material by action of inertia and falling motion will be collected above the liquid level of the solvent at the upper end of the vessel 3. The buoyancy alone of the seed material, however, is not sufficient to overcome the surface tension of the liquid level and to cause said material to move out of the vessel 3. In order to move said material out of the vessel 3 advantage is taken of a physical feature which is more fully explained as follows.

Upon downward motion of the tube 2 a certain acceleration will be imparted to the seed material contained therein, the kinetic energy due to this acceleration being transferred to the solvent contained in the under portion of the tube 2 and of the vessel 3. Underneath the liquid level the seed material within the tube 2 is soaked with solvent to practically form a kind of piston. During the short time of the sudden downward motion the solvent will not be able to again ascend within the tube, as the aforesaid piston formed by the seed material soaked with solvent will present an excessive resistance against the entrance of the liquid. The impact imparted to the seed material rather propagates upward within the liquid positioned in the annular space between the tube 2 and the vessel 3 and finally acts upon the seed material positioned at the upper end of the vessel 3. An impulse will thus be given to this seed material in the manner of a water-hammer, this impulse being further assisted by the buoyancy of the column of the seed material, thus overcoming the surface tension of the liquid. The solvent due to its own weight will ooze or trickle back into the vessel 3, while the shreds are progressively ascending beyond the liquid level and, after having reached a sufficient height, will flow over the edge of the tube 3 and fall into the chute 4 which is closed all around, whence it is discharged through the outlet 9.

In case of seeds of a consistency similar to that of felt a stripper may be provided within the chute 4 at the upper edge of the tube 3.

The vapors of the solvent will be absorbed by the column of dry seed material positioned above the liquid level in order to avoid a loss of solvent. The solvent introduced through the inlet 6 enters the tube 2 in counter-current to the motion of the seed material and after being enriched with the oil of the seed material will pass as "miscella" through the perforations 7 into the pipe 10.

A sluice 8 is provided at the bottom of the vessel 3 said sluice serving for the separation of relatively heavy impurities, such as sand or mud, during the process of extraction.

In the other form of extraction apparatus shown in Fig. 2 the supply tube 2 for the seed and the vessel 3 for the solvent are of U-shaped conformation in contradistinction to the concentrical arrangement of these parts according to Fig. 1. In other respects the construction and operation of the apparatus shown in Fig. 2 is in agreement with that shown in Fig. 1. According to Fig. 2 the seed material to be subjected to extraction by means of the solvent is again supplied to the tube 2 through the charging hopper 7, said tube 2 being likewise movable in upward and downward direction but solely at its upper portion. According to Fig. 2 furthermore, the leg or vessel 3 forms a continuation of the tube 2, the solvent being supplied to said leg or vessel 3 through the inlet 6 provided near the upper end of the latter. Owing to the upward and downward motion of the tube 2 the seed material is forced downward through the solvent and thereupon round the under part of the U-shaped tube and thereupon ascends in vertical direction through the vessel 3, whereupon it flows round the upper edge of the latter to be discharged from the apparatus by way of the chute 4.

The stroke of the tube 3 as well as the number of periodical impulses imparted to the seed material will define the velocity of passage of said material through the tube and therewith the extent of the extraction of the oil. If a single passage of the seed material through the apparatus is not sufficient, the shreds discharged from the chute 4 may be supplied to the supply tube 2 of a second extraction apparatus. Any number of such extraction apparatus may be used to attain a step-by-step extraction of the oil to any desired extent. In case of using a plurality of such apparatus it will be necessary to provide a yielding or flexible connection, such as the bellows 5, between the several apparatus in order to prevent the vapors of the solvent from escaping and to attain proper flexibility of the connections between the several apparatus permitting to impart the aforesaid periodical impulses to the seed material.

In order to recover the solvent from the "miscella" and from the shreds any of the processes known for this purpose may be used.

My invention is not restricted to the extraction of materials containing oil or fat but may also be used in a general way for the extraction of any desired other materials such as tanning acids and the like.

I claim:

1. An extraction apparatus comprising a vertical tube open at both ends and adapted for the reception of the material to be subjected to extraction, a vessel surrounding said tube and adapted for the reception of the solvent, means for periodically moving said tube upward and downward within said vessel, and means for discharging said material subsequent to its passage through said solvent from the upper end of said vessel.

2. An extraction apparatus comprising a vertical tube open at both ends and adapted for the reception of a material to be subjected to extraction, means for periodically moving said tube in upward and downward direction, a U-shaped vessel, one leg of said vessel surrounding said tube and adapted for the reception of the solvent, the other leg of said vessel being provided with means for discharging said material subsequent to its passage through said solvent.

3. An extraction apparatus as specified by claim 1, said means for periodically moving said tube consisting of a mechanical device having an adjustable stroke and adapted to impart to said tube periodically a slow motion in upward direction and a quick motion in downward direction.

4. An apparatus for the continuous extraction of oil-containing and other materials, said apparatus comprising a vertical tube receiving the material to be subjected to extraction, means periodically imparting to said tube a slow motion in the upward direction and a quick motion in the downward direction to cause a movement of said material, a vessel for the reception of a solvent having a higher specific weight than said material, the interior of said vessel communicating with that of said tube, means connected with said vessel for introducing said solvent into said vessel and causing said solvent to flow in a direction counter-current to that of said material, means elastically connecting said vessel with said tube, and means discharging said material after its passage through said solvent.

5. An apparatus for the continuous extraction of oil-containing and other materials, said apparatus comprising a vertical tube receiving the material to be subjected to extraction, means periodically reciprocating said tube to cause a movement of said material, hollow means receiving a solvent, said solvent receiving means having a portion concentrically enclosing said tube, another elastic portion connected with said tube, and a further portion for introducing said solvent thereinto and causing it to flow in a direction counter-current to that of said material, the interior of the solvent receiving means communicating with that of said tube, and means discharging said material after its passage through said solvent.

6. An apparatus for the continuous extraction of oil-containing and other materials, said apparatus comprising a vertical tube receiving the oil-containing material to be subjected to extraction, means periodically reciprocating said tube to cause a movement of said material, a vessel for the reception of a solvent, the interior of said vessel communicating with that of said tube, means connected with said vessel for introducing said solvent into said vessel and causing said solvent to flow in a direction counter-current to that of said material, means elastically connecting said vessel with said tube, means discharging said material after its passage through said solvent, and a tube situated within the material-receiving tube for the discharge of the oil-containing solvent.

HEINRICH SÜSS.